United States Patent
Miki

(10) Patent No.: US 12,407,786 B2
(45) Date of Patent: Sep. 2, 2025

(54) INFORMATION PROCESSING APPARATUS FOR DETECTING NEARBY USERS AND TRANSITIONING BETWEEN ENERGY CONSUMPTION MODES

(71) Applicant: FUJIFILM BUSINESS INNOVATION CORP., Tokyo (JP)

(72) Inventor: Masayoshi Miki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 453 days.

(21) Appl. No.: 17/711,325

(22) Filed: Apr. 1, 2022

(65) Prior Publication Data
US 2023/0071689 A1 Mar. 9, 2023

(30) Foreign Application Priority Data
Sep. 3, 2021 (JP) .................................. 2021-144244

(51) Int. Cl.
*H04N 1/00* (2006.01)
(52) U.S. Cl.
CPC ..... *H04N 1/00896* (2013.01); *H04N 1/00323* (2013.01); *H04N 2201/0094* (2013.01)
(58) Field of Classification Search
CPC ................................................ H04N 1/00896
See application file for complete search history.

(56) References Cited

U.S. PATENT DOCUMENTS

| 10,015,343 B2 | 7/2018 | Kuroishi et al. |
| 2012/0229831 A1 | 9/2012 | Kuroishi et al. |
| 2014/0153013 A1 * | 6/2014 | Imamura ............ G03G 15/6552 358/1.12 |
| 2014/0355020 A1 * | 12/2014 | Shiraishi ............. G06K 15/406 358/1.13 |
| 2016/0352946 A1 * | 12/2016 | Eguchi ............... G06K 15/4055 |
| 2017/0041503 A1 * | 2/2017 | Nobutani .............. H04N 1/442 |
| 2017/0220787 A1 * | 8/2017 | Inokuchi ................ G06F 21/32 |
| 2018/0032290 A1 * | 2/2018 | Fujita ................. H04N 1/00896 |
| 2018/0115673 A1 * | 4/2018 | Yamasaki ............. H04N 1/442 |
| 2019/0324697 A1 * | 10/2019 | Okazaki ............... G06F 3/1205 |

(Continued)

FOREIGN PATENT DOCUMENTS

| JP | 2012-186720 A | 9/2012 |
| JP | 2013-29839 A | 2/2013 |
| JP | 2013-130993 A | 7/2013 |

(Continued)

OTHER PUBLICATIONS

May 20, 2025 Office Action issued in Japanese Patent Application No. 2021-144244.

*Primary Examiner* — Benjamin O Dulaney
(74) *Attorney, Agent, or Firm* — Oliff PLC

(57) ABSTRACT

An information processing apparatus includes a processor configured to: cause the information processing apparatus to make transition from a first mode to a second mode with less energy consumption than the first mode when a non-detection period in which presence of a user is not detected around the information processing apparatus has reached a preset threshold period; and continue to measure the non-detection period when the presence of the user is detected and a preset condition is satisfied while the non-detection period is being measured before reaching the threshold period.

12 Claims, 11 Drawing Sheets

(56) References Cited

U.S. PATENT DOCUMENTS

2023/0068473 A1\* 3/2023 Watanabe .......... G03G 15/5029

FOREIGN PATENT DOCUMENTS

| JP | 2015-44665 A | 3/2015 |
| JP | 2016-189596 A | 11/2016 |
| JP | 2018-140511 A | 9/2018 |
| JP | 2018-161803 A | 10/2018 |
| JP | 2019-171876 A | 10/2019 |

\* cited by examiner

FIG. 4
RELATED ART
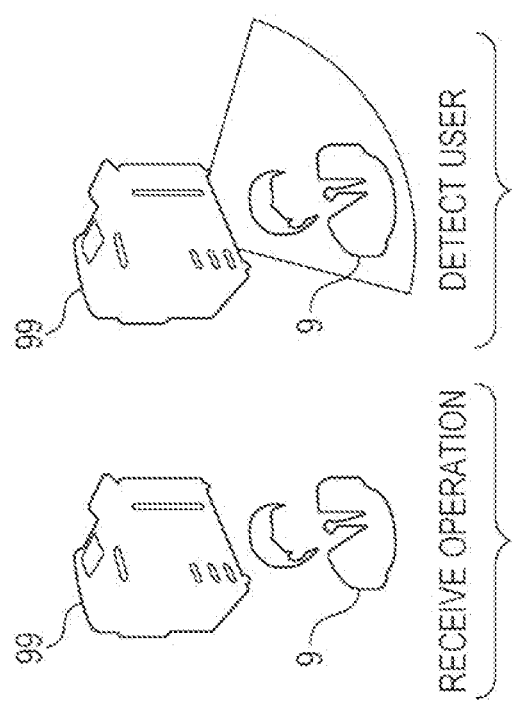
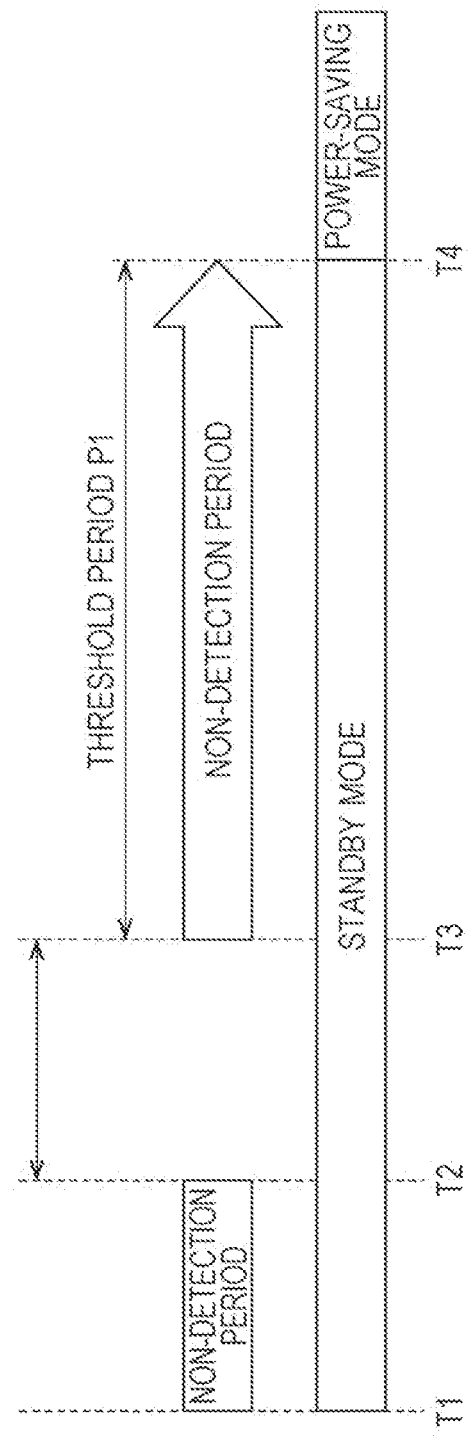

INFORMATION PROCESSING APPARATUS FOR DETECTING NEARBY USERS AND TRANSITIONING BETWEEN ENERGY CONSUMPTION MODES

CROSS-REFERENCE TO RELATED APPLICATIONS

This application is based on and claims priority under 35 USC 119 from Japanese Patent Application No. 2021-144244 filed Sep. 3, 2021.

BACKGROUND

(i) Technical Field

The technology disclosed herein relates to an information processing apparatus, a non-transitory computer readable medium storing a program, and an information processing method.

(ii) Related Art

There are technologies for making transition to a mode with less energy consumption.

Japanese Unexamined Patent Application Publication No. 2013-029839 discloses a power supply control apparatus including a power supply state transition controller, a plurality of moving object detectors including a first moving object detector and a second moving object detector, an instructor, and a state keeper. The power supply state transition controller makes transition among a plurality of power supplying states different in power consumptions and a non-power supplying state for an operation part that operates by power supply from a commercial power source. In the non-power supplying state, the operation part is not supplied with electric power from the commercial power source, or is supplied with electric power equal to or smaller than preset electric power and to be used for controlling determination as to whether to receive the power supply. The first moving object detector detects a moving object including a user of the operation part in a preset relatively wide area, and is supplied with electric power for the determination control in the non-power supplying state. The second moving object detector detects the moving object in a preset relatively narrow area near the operation part, and is supplied with electric power for the determination control when the first moving object detector has detected the moving object. The instructor gives an instruction for state transition between the non-power supplying state and the power supplying state based on predetermined transition conditions including detection results from the moving object detectors. Until the moving object is not detected by the second moving object detector, the state keeper keeps the power supplying state against an instruction given by the instructor for transition from the power supplying state to the non-power supplying state in response to satisfaction of the transition conditions.

Japanese Unexamined Patent Application Publication No. 2012-186720 discloses a power supply control apparatus including a power supply state transition controller, a plurality of moving object detectors, a timer, a transition instructor, and an instruction timing postponer. The power supply state transition controller makes transition among a plurality of power supplying states different in power consumptions and a non-power supplying state for an operation part that operates by power supply from a commercial power source. In the non-power supplying state, the operation part is not supplied with electric power from the commercial power source, or is supplied with electric power equal to or smaller than preset electric power and to be used for controlling determination as to whether to receive the power supply. The moving object detectors detect a moving object including an expected user of the operation part in preset areas under different detection conditions. The timer measures a period of the unused state of the operation part in the power supplying state. If the measured period has reached a preset period to determine transition to the non-power supplying state and the operation part remains unused, the transition instructor instructs the power supply state transition controller to make transition to the non-power supplying state. If the moving object is detected by the moving object detectors at an instruction timing of the transition instructor, the instruction timing postponer postpones the instruction timing.

Japanese Unexamined Patent Application Publication No. 2016-189596 discloses a power supply control apparatus including at least two types of moving object detector, a state transitioner, a manual recovery operator, an automatic recovery controller, a selector, a power supply interruption controller, and a time setter. The moving object detectors may detect a moving object around the body of a processing apparatus including an operation target that operates by power supply, and have a relationship in which at least detectable distances relatively differ from each other. In response to satisfaction of a preset condition, the state transitioner makes transition to a power supplying state in which electric power is supplied to the operation target or a power supply interruption state in which the power supply is interrupted. The manual recovery operator is operated to satisfy the condition for transition to be made from the power supply interruption state to the power supplying state by the state transitioner. When one of the moving object detectors with a longer detection distance has detected the moving object, the automatic recovery controller causes the other moving object detector with a shorter detection distance to start detection. When the other moving object detector has detected the moving object, the automatic recovery controller determines that the condition is satisfied. The selector selects options as to whether to enable or disable the function of the automatic recovery controller. As a timing to make transition from the power supplying state to the power supply interruption state by the state transitioner, the power supply interruption controller sets a timing when a preset period has elapsed since the moving object was not detected by the other moving object detector. If the automatic recovery controller is disabled by the selector, the time setter sets the preset period shorter in the power supply interruption controller than in a case where the automatic recovery controller is enabled.

SUMMARY

Aspects of non-limiting embodiments of the present disclosure relate to the following circumstances. There is an information processing apparatus in which transition may be made between a first mode and a second mode with less energy consumption than the first mode. Examples of the information processing apparatus include an image forming apparatus. For example, the apparatus includes a motion sensor to detect the presence of a user around the apparatus. The apparatus measures a non-detection period when the presence of the user is not detected by the motion sensor. The apparatus makes transition from the first mode to the second mode when the measured non-detection period has reached a preset threshold period.

If the presence of the user is detected by the motion sensor before the non-detection period exceeds the threshold period, the apparatus resets the measured non-detection period.

The non-detection period is reset even if the motion sensor has detected a person who does not use the apparatus. Therefore, there is a possibility that the transition to the second mode is not made even though the period in which the apparatus is substantially unused by the user has reached the threshold period.

Aspects of non-limiting embodiments of the present disclosure therefore relate to an information processing apparatus, a non-transitory computer readable medium storing an information processing program, and an information processing method in which the transition to the second mode with less energy consumption may be made in a shorter period than in a case where the non-detection period is always reset in response to detection of the presence of the user around the apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to: cause the information processing apparatus to make transition from a first mode to a second mode with less energy consumption than the first mode when a non-detection period in which presence of a user is not detected around the information processing apparatus has reached a preset threshold period; and continue to measure the non-detection period when the presence of the user is detected and a preset condition is satisfied while the non-detection period is being measured before reaching the threshold period.

BRIEF DESCRIPTION OF THE DRAWINGS

Exemplary embodiments of the present disclosure will be described in detail based on the following figures, wherein:

FIG. 4 illustrates an example of a transition process to be performed by a related-art image forming apparatus;

DETAILED DESCRIPTION

Figure 1:
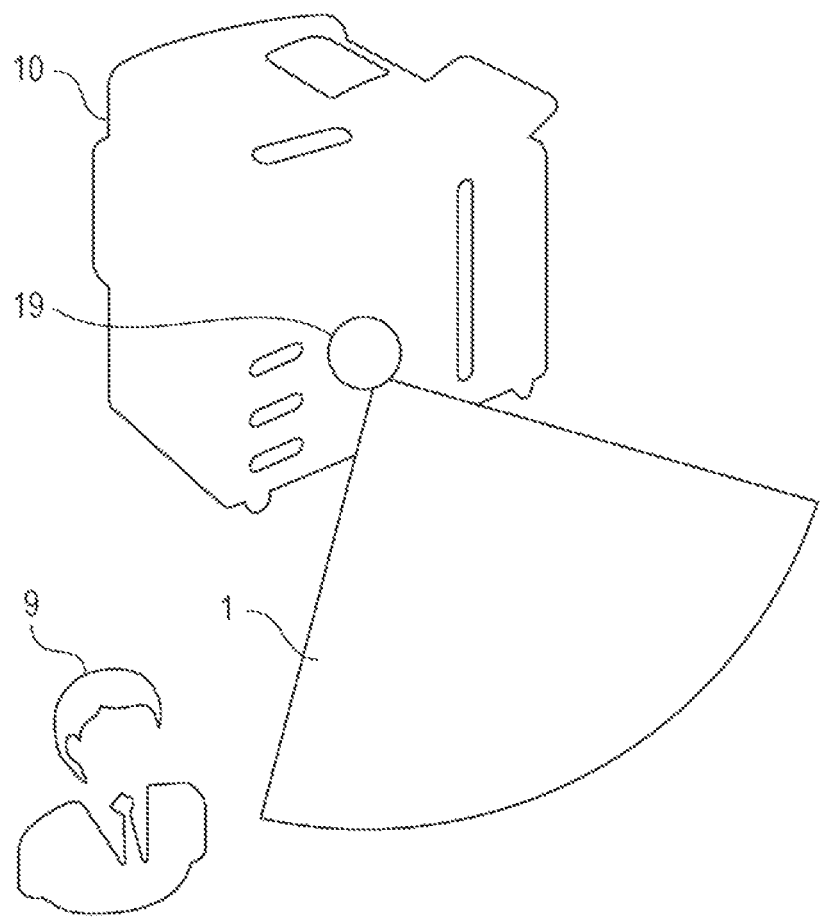
FIG. 1 is a schematic configuration diagram of an image forming apparatus.

Exemplary embodiments of the technology disclosed herein are described below with reference to the drawings. In the drawings, the same or equivalent components or parts are represented by the same reference symbols. In the drawings, dimensional ratios are exaggerated for convenience of description, and may differ from actual ratios.

FIG. 1 is a schematic configuration diagram of an image forming apparatus 10 according to the exemplary embodiments of the present disclosure. In FIG. 1, a detection range 1 of a sensor 19 is a range in which the image forming apparatus 10 that is an example of an information processing apparatus may detect the presence of a user 9.

For example, the image forming apparatus 10 may perform printing, copying, scanning, and facsimile processes in response to operations by the user 9. The image forming apparatus 10 includes the sensor 19 that detects the presence of the user 9. When a non-detection period in which the presence of the user 9 is not detected around the image forming apparatus 10 has reached a preset threshold period, the image forming apparatus 10 makes transition from a first mode to a second mode with less energy consumption than the first mode. Specifically, the image forming apparatus 10 may make transition to a standby mode serving as the first mode and a power-saving mode serving as the second mode. In the standby mode, the printing process or the like may be performed. In the power-saving mode, the energy consumption is less than that in the standby mode. The energy consumption refers to power consumption. In the power-saving mode, the energy consumption is reduced compared with the standby mode by, for example, powering off a display, keeping the temperature of a fuser of an image forming unit to be lower than in the standby mode, or powering off the fuser. When the presence of the user 9 is detected but no operation is made by the user 9 while the non-detection period is being measured before reaching the threshold period, the image forming apparatus 10 continues to measure the non-detection period. When the non-detection period has reached the threshold period while the presence of the user 9 is not detected, the image forming apparatus 10 makes transition to the power-saving mode. The threshold period is predetermined as a time margin before transition from the first mode to the second mode.

First Exemplary Embodiment

Figure 2:
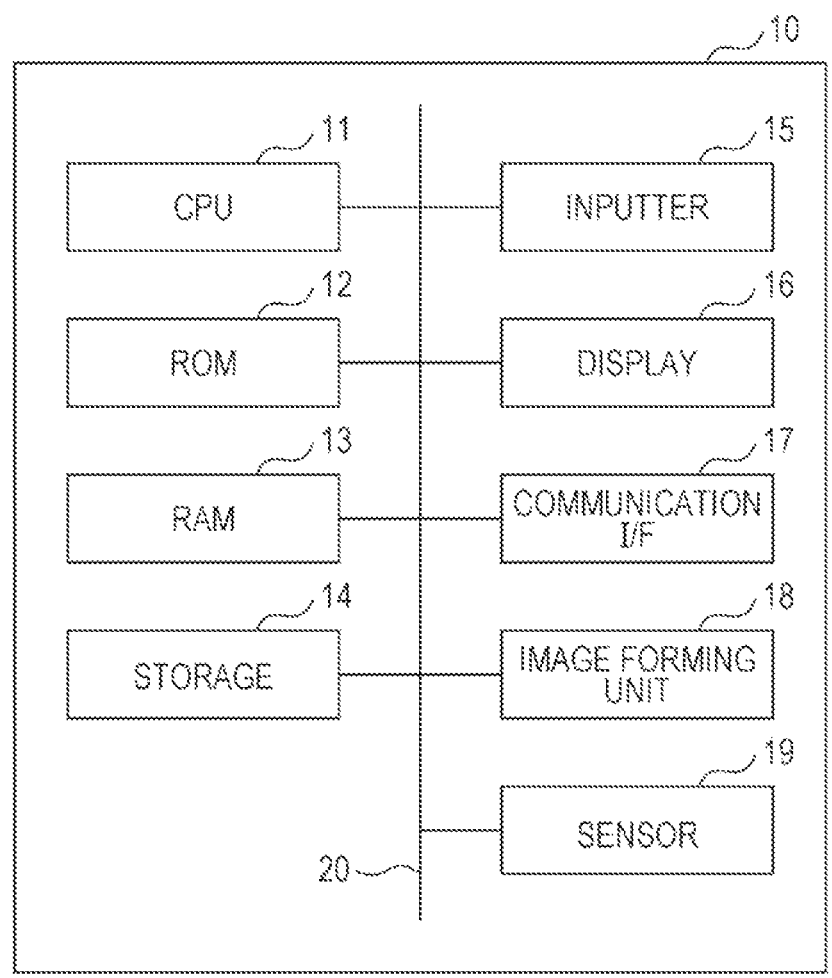
FIG. 2 is a block diagram illustrating the hardware configuration of an image forming apparatus according to a first exemplary embodiment.

FIG. 2 is a block diagram illustrating the hardware configuration of the image forming apparatus 10. The image forming apparatus 10 includes a central processing unit (CPU) 11, a read only memory (ROM) 12, a random access memory (RAM) 13, a storage 14, an inputter 15, a display 16, a communication interface (communication I/F) 17, an image forming unit 18, and the sensor 19. Those components are communicably connected to each other via a bus 20.

The CPU 11 executes various programs and controls individual parts. That is, the CPU 11 reads the programs from the ROM 12 or the storage 14, and executes the programs by using the RAM 13 as a working area. The CPU 11 controls the components and performs various arithmetic processes based on the programs recorded in the ROM 12 or the storage 14. In this exemplary embodiment, the ROM 12 or the storage 14 stores an information processing program for making transition among the modes.

The ROM 12 stores various programs and various types of data. The RAM 13 temporarily stores the programs or data as the working area. The storage 14 is a hard disk drive (HDD) or a solid state drive (SSD), and stores various types of data and various programs including an operating system.

The inputter 15 includes a keyboard and a pointing device such as a mouse, and is used for inputting various types of information.

Examples of the display 16 include a liquid crystal display that displays various types of information. The display 16 may function as the inputter 15 by employing a touch panel system.

The communication interface 17 is used for communicating with other apparatuses such as a database. Examples of the communication interface 17 include Ethernet (registered trademark), FDDI, and Wi-Fi (registered trademark).

The image forming unit 18 forms an image on a recording medium such as paper based on print data. Examples of the image forming system include a toner system and an inkjet system. The image forming unit 18 includes a fuser that fixes toner onto the recording medium by, for example, heating.

The sensor 19 detects the presence of the user 9 around the image forming apparatus 10 by detecting a change in the detection range 1. For example, the sensor 19 detects the presence of the user 9 by detecting a change around the image forming apparatus 10, including a change in temperature or movement of an object. Examples of the sensor 19 include a motion sensor such as a pyroelectric sensor that detects an infrared ray or a reflective sensor that detects reflected light. The "non-detection period" in this exemplary embodiment is a period in which the presence of the user 9 is not detected by the sensor 19. An image forming apparatus 10 including a plurality of sensors 19 is described later in a third exemplary embodiment.

Next, operations of the image forming apparatus 10 are described.

Figure 3:
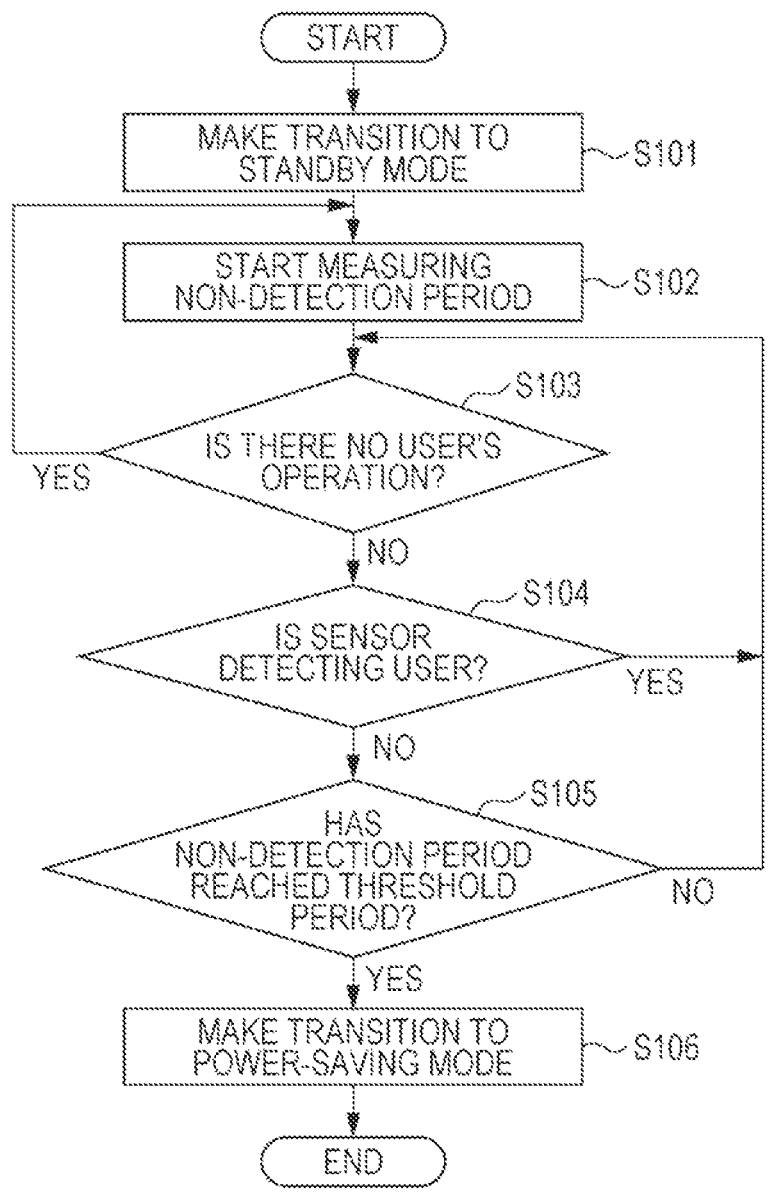
FIG. 3 is a flowchart illustrating a flow of a transition process to be performed by the image forming apparatus according to the first exemplary embodiment.

FIG. 3 is a flowchart illustrating a flow of a transition process to be performed by the image forming apparatus 10. The transition process is performed by the CPU 11 that executes a transition program read from the ROM 12 or the storage 14 and loaded on the RAM 13. The process illustrated in FIG. 3 is performed, for example, in response to activation of the image forming apparatus 10 or the start of use of the image forming apparatus 10 by the user in the power-saving mode.

In Step S101, the CPU 11 makes transition to the standby mode. That is, the CPU 11 causes its image forming apparatus 10 to make transition to the standby mode. In other words, the image forming apparatus 10 makes transition to the standby mode. The CPU 11 proceeds to Step S102.

In Step S102, the CPU 11 starts measuring the non-detection period. The CPU 11 proceeds to Step S103.

In Step S103, the CPU 11 determines whether no operation is made by the user 9. Examples of the operation to be made by the user 9 include an operation on the inputter 15 by the user 9. If determination is made that no operation is made by the user 9 (Step S103: NO), the CPU 11 proceeds to Step S104. If determination is made that the operation is made by the user 9 (Step S103: YES), the CPU 11 proceeds to Step S102. That is, if determination is made that the operation is made by the user 9 (Step S103: YES), the CPU 11 resets the non-detection period, and starts measuring the reset non-detection period.

In Step S104, the CPU 11 determines whether the sensor 19 is detecting the user 9. If determination is made that the sensor 19 is detecting the user 9 (Step S104: YES), the CPU 11 proceeds to Step S103. If determination is made that the sensor 19 is not detecting the user 9 (Step S104: NO), the CPU 11 proceeds to Step S105.

Examples of the case where no operation is made by the user 9 (Step S103: NO) and the sensor 19 is detecting the user 9 (Step S104: YES) include a case where a person passing by the image forming apparatus 10 is detected. Examples of this case also include a case where the user 9 who is going to take a printed material output from the image forming apparatus 10 is detected, a case where a temperature change is detected due to sunlight, and a case where movement of an object is detected due to wind.

In Step S105, the CPU 11 determines whether the non-detection period has reached the threshold period. If determination is made that the non-detection period has reached the threshold period (Step S105: YES), the CPU 11 proceeds to Step S106. If determination is made that the non-detection period has not reached the threshold period (Step S105: NO), the CPU 11 proceeds to Step S103.

In Step S106, the CPU 11 makes transition to the power-saving mode. The CPU 11 terminates the transition process.

Through Step S102 to Step S104, the CPU 11 continues to measure the non-detection period when the presence of the user 9 is detected but no operation is made by the user 9 while the non-detection period is being measured before reaching the threshold period. Through Step S104 to Step S106, the CPU 11 makes transition to the power-saving mode when the non-detection period has reached the threshold period while the presence of the user 9 is not detected.

An example of the transition process to be performed by the image forming apparatus is described with reference to FIG. 4 and FIG. 5. First, a related-art image forming apparatus 99 is described with reference to FIG. 4. Next, the image forming apparatus 10 according to the first exemplary embodiment is described with reference to FIG. 5. The related-art image forming apparatus 99 resets the non-detection period in response to detection of the presence of the user 9 during the measurement of the non-detection period. Each of the image forming apparatus 10 and the related-art image forming apparatus 99 makes transition to the power-saving mode when the non-detection period has reached a threshold period P1.

Figure 5:
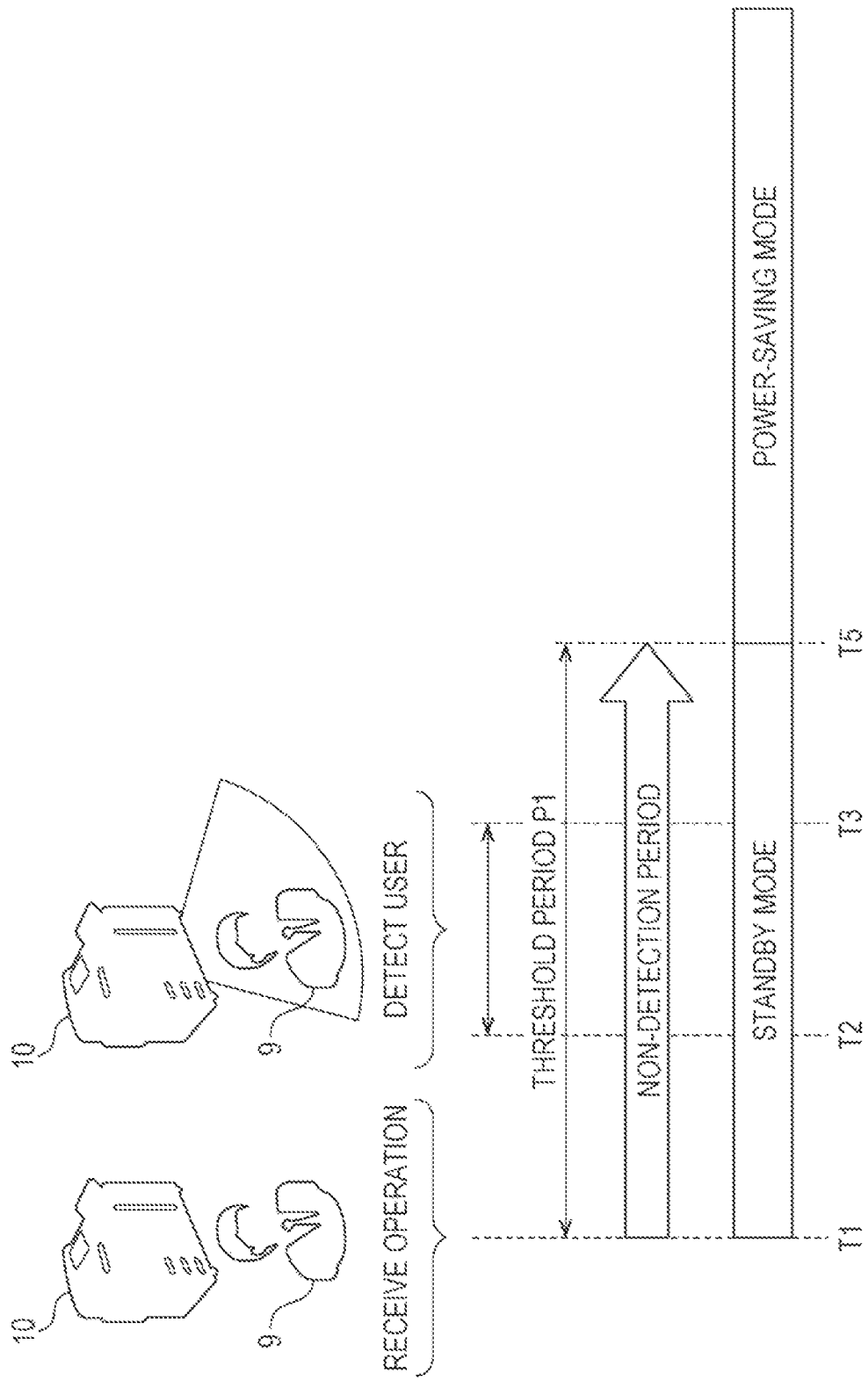
FIG. 5 illustrates an example of the transition process to be performed by the image forming apparatus according to the first exemplary embodiment.

In FIG. 4 and FIG. 5, the horizontal axis represents a time axis, and the time advances rightward in the figures. At a time T1, each of the image forming apparatus 10 and the related-art image forming apparatus 99 receives the operation made by the user 9, and starts measuring the non-detection period. Each of the image forming apparatus 10 and the related-art image forming apparatus 99 detects the presence of the user 9 from a time T2 to a time T3. After the time T1, no operation is made by the user 9.

As illustrated in FIG. 4, the related-art image forming apparatus 99 resets the measurement of the non-detection period because the presence of the user 9 is detected at the time T2 while the non-detection period is being measured. The related-art image forming apparatus 99 starts measuring the reset non-detection period at the time T3 when the presence of the user 9 is not detected. The related-art image forming apparatus 99 makes transition to the power-saving mode at a time T4 when the non-detection period being measured from the time T3 has reached the threshold period P1.

As illustrated in FIG. 5, the image forming apparatus 10 of the first exemplary embodiment continues to measure the non-detection period as a process corresponding to Step S103 and Step S104 (Step S103: NO, Step S104: YES) because the presence of the user 9 is detected but no operation is made by the user 9 from the time T2 to the time T3. The image forming apparatus 10 makes transition to the power-saving mode at a time T5 when the non-detection period being measured from the time T1 has reached the threshold period P1.

Second Exemplary Embodiment

Next, a second exemplary embodiment is described. In the second exemplary embodiment, the transition process involves making transition among three or more modes in addition to the configuration of the first exemplary embodiment. The hardware configuration of the second exemplary embodiment is identical to the hardware configuration of the first exemplary embodiment. Components and operations similar to those in the first exemplary embodiment are represented by the same reference symbols to omit description thereof.

The image forming apparatus 10 may make transition to any one of the three or more modes different in energy consumptions. In the image forming apparatus 10, threshold periods are set for the respective transitions. Specifically, the image forming apparatus 10 may make transition to the standby mode in which the printing process or the like may be performed, a low-power mode in which the energy consumption is less than that in the standby mode, and a sleep mode in which the energy consumption is less than that in the low-power mode. In the low-power mode, the energy consumption is reduced compared with the standby mode by, for example, powering off the display 16 or keeping the temperature of the fuser of the image forming unit 18 to be lower than in the standby mode. In the sleep mode, the energy consumption is reduced compared with the low-power mode by, for example, powering off the image forming unit 18.

In response to detection of the presence of the user 9 during the measurement of the non-detection period, the image forming apparatus 10 stores the low-power mode as a previously transitioned mode, and makes transition to the standby mode with more energy consumption than the low-power mode. If no operation is made by the user 9 and the presence of the user 9 is not detected after the transition to the standby mode, the image forming apparatus 10 makes transition back to the stored low-power mode.

Figure 6:
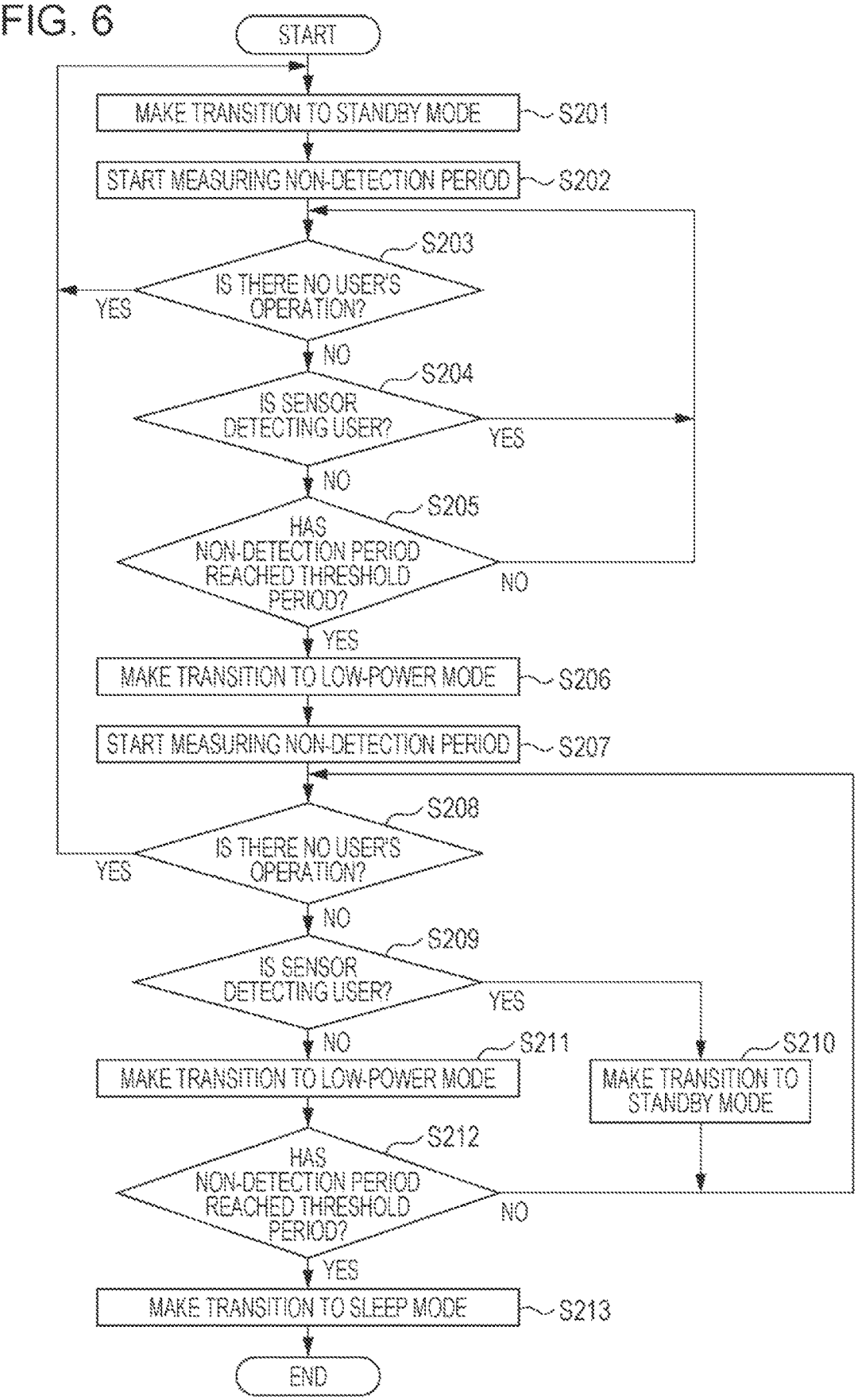
FIG. 6 is a flowchart illustrating a flow of a transition process to be performed by an image forming apparatus according to a second exemplary embodiment.

Operations of the image forming apparatus 10 are described. FIG. 6 is a flowchart illustrating a flow of the transition process to be performed by the image forming apparatus 10. The transition process is performed by the CPU 11 that executes the transition program read from the ROM 12 or the storage 14 and loaded on the RAM 13.

In Step S201, the CPU 11 makes transition to the standby mode. The CPU 11 proceeds to Step S202.

In Step S202, the CPU 11 starts measuring the non-detection period. The CPU 11 proceeds to Step S203.

In Step S203, the CPU 11 determines whether no operation is made by the user 9. If determination is made that no operation is made by the user 9 (Step S203: NO), the CPU 11 proceeds to Step S204. If determination is made that the operation is made by the user 9 (Step S203: YES), the CPU 11 proceeds to Step S201.

In Step S204, the CPU 11 determines whether the sensor 19 is detecting the user 9. If determination is made that the sensor 19 is detecting the user 9 (Step S204: YES), the CPU 11 proceeds to Step S203. If determination is made that the sensor 19 is not detecting the user 9 (Step S204: NO), the CPU 11 proceeds to Step S205.

In Step S205, the CPU 11 determines whether the non-detection period has reached the threshold period. If determination is made that the non-detection period has reached the threshold period (Step S205: YES), the CPU 11 proceeds to Step S206. If determination is made that the non-detection period has not reached the threshold period (Step S205: NO), the CPU 11 proceeds to Step S203. The threshold period in Step S205 is preset to make transition to the low-power mode.

In Step S206, the CPU 11 makes transition to the low-power mode. The CPU 11 proceeds to Step S207.

In Step S207, the CPU 11 starts measuring the non-detection period. The CPU 11 proceeds to Step S208.

In Step S208, the CPU 11 determines whether no operation is made by the user 9. If determination is made that no operation is made by the user 9 (Step S208: NO), the CPU 11 proceeds to Step S209. If determination is made that the operation is made by the user 9 (Step S208: YES), the CPU 11 proceeds to Step S201.

In Step S209, the CPU 11 determines whether the sensor 19 is detecting the user 9. If determination is made that the sensor 19 is detecting the user 9 (Step S209: YES), the CPU 11 proceeds to Step S210. If determination is made that the sensor 19 is not detecting the user 9 (Step S209: NO), the CPU 11 proceeds to Step S211.

In Step S210, the CPU 11 makes transition to the standby mode. In other words, the CPU 11 makes transition to the standby mode with more energy consumption than the previously transitioned low-power mode. The CPU 11 stores information indicating that the previously transitioned mode is the low-power mode. The CPU 11 continues to measure the non-detection period without resetting the non-detection period. The CPU 11 proceeds to Step S208.

In Step S211, the CPU 11 makes transition to the low-power mode. That is, the CPU 11 makes transition back to the low-power mode stored in Step S210. The CPU 11 may take no action if the transition has already been made to the low-power mode. The CPU 11 proceeds to Step S212.

In Step S212, the CPU 11 determines whether the non-detection period has reached the threshold period. If determination is made that the non-detection period has reached the threshold period (Step S212: YES), the CPU 11 proceeds to Step S213. If determination is made that the non-detection period has not reached the threshold period (Step S212: NO), the CPU 11 proceeds to Step S208. The threshold period in Step S212 is preset to make transition to the sleep mode.

In Step S213, the CPU 11 makes transition to the sleep mode. The CPU 11 terminates the transition process.

Through Step S205 and Step S212, the CPU 11 determines whether the measured non-detection period has reached the threshold period set for each transition. Through Step S207 to Step S211, in response to detection of the presence of the user 9 during the measurement of the non-detection period, the CPU 11 stores the low-power mode as the previously transitioned mode, and makes transition to the standby mode with more energy consumption than the low-power mode while continuing to measure the non-detection period. If no operation is made by the user 9 and the presence of the user 9 is not detected, the CPU 11 makes transition back to the stored low-power mode.

An example of the transition process to be performed by the image forming apparatus is described with reference to FIG. 7 and FIG. 8. First, the related-art image forming apparatus 99 is described with reference to FIG. 7. Next, the image forming apparatus 10 according to the second exemplary embodiment is described with reference to FIG. 8. In response to transition from the low-power mode to the standby mode, the related-art image forming apparatus 99 starts measuring the non-detection period to make transition to the low-power mode even if no operation is made by the user. If the transition has already been made to the standby mode, each of the image forming apparatus 10 and the related-art image forming apparatus 99 makes transition to the low-power mode when the non-detection period has reached a threshold period P2. If the transition has already been made to the low-power mode, each of the image forming apparatus 10 and the related-art image forming apparatus 99 makes transition to the sleep mode when the non-detection period has reached a threshold period P3.

Figure 7:
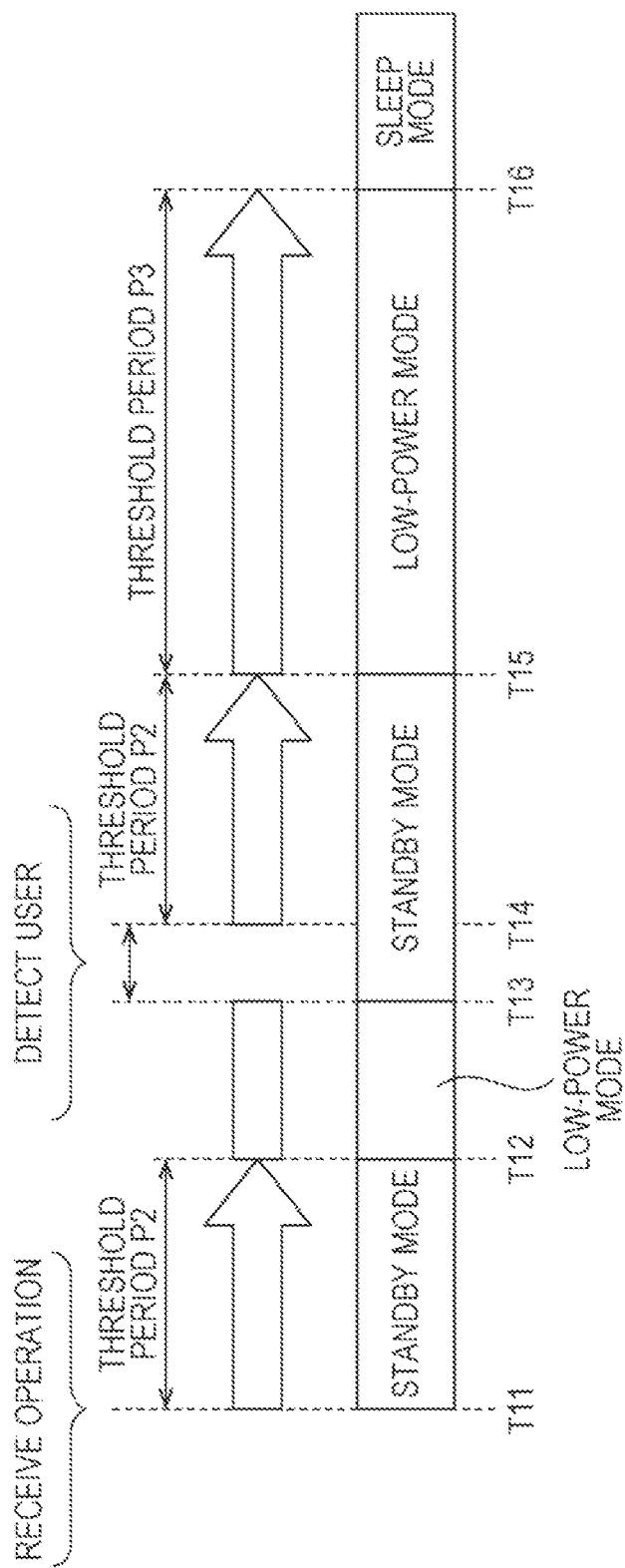
FIG. 7 illustrates an example of a transition process to be performed by a related-art image forming apparatus.
Figure 8:
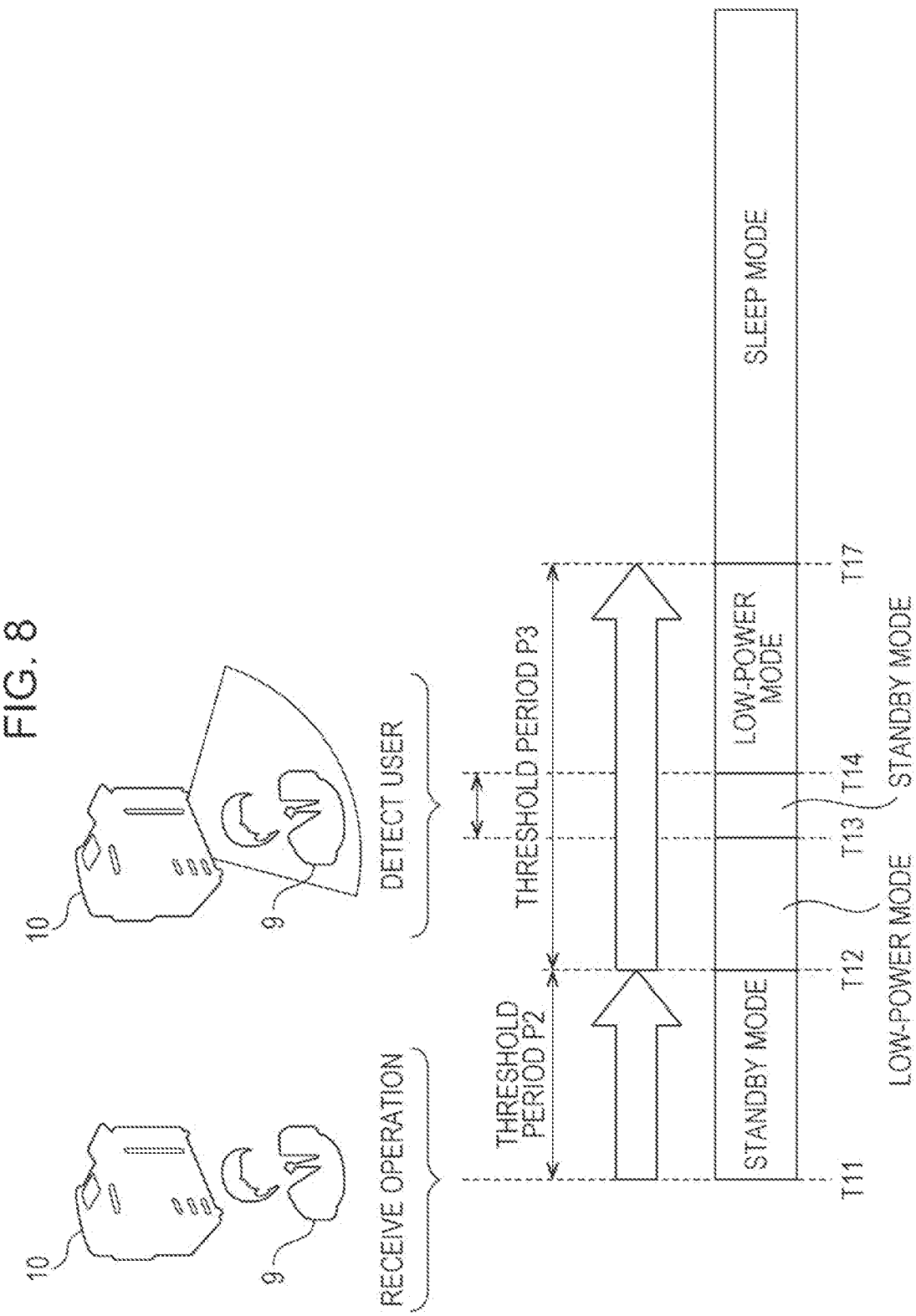
FIG. 8 illustrates an example of the transition process to be performed by the image forming apparatus according to the second exemplary embodiment.

In FIG. 7 and FIG. 8, the horizontal axis represents a time axis, and the time advances rightward in the figures. At a time T11, each of the image forming apparatus 10 and the related-art image forming apparatus 99 receives the operation made by the user 9, and starts measuring the non-detection period. Each of the image forming apparatus 10 and the related-art image forming apparatus 99 makes transition to the low-power mode and starts measuring the non-detection period at a time T12 when the non-detection period being measured from the time T11 has reached the threshold period P2. Each of the image forming apparatus 10 and the related-art image forming apparatus 99 detects the presence of the user 9 from a time T13 to a time T14, and makes transition to the standby mode at the time T13. After the time T11, no operation is made by the user 9.

As illustrated in FIG. 7, the related-art image forming apparatus 99 resets the measurement of the non-detection period because the presence of the user 9 is detected at the time T13 while the non-detection period is being measured. The related-art image forming apparatus 99 starts measuring the reset non-detection period at the time T14 when the presence of the user 9 is not detected, and makes transition to the low-power mode at a time T15 when the non-detection period has reached the threshold period P2. The related-art image forming apparatus 99 makes transition to the sleep mode at a time T16 when the non-detection period being measured from the time T15 has reached the threshold period P3.

As illustrated in FIG. 8, the image forming apparatus 10 continues to measure the non-detection period because the presence of the user 9 is detected but no operation is made by the user 9 from the time T13 to the time T14. The image forming apparatus 10 makes transition to the low-power mode as a process corresponding to Step S211 at the time T14 when the presence of the user 9 is not detected. The image forming apparatus 10 makes transition to the sleep mode at a time T17 when the non-detection period being measured from the time T12 has reached the threshold period P3.

Third Exemplary Embodiment

Next, the third exemplary embodiment is described. In the third exemplary embodiment, the transition process involves temporarily stopping the measurement of the non-detection period in addition to the configuration of the first exemplary embodiment or the second exemplary embodiment. The hardware configuration of the third exemplary embodiment is identical to the hardware configuration of the first exemplary embodiment. Components and operations similar to those in the first exemplary embodiment and the second exemplary embodiment are represented by the same reference symbols to omit description thereof.

If the sensor 19 is detecting the presence of the user 9, the image forming apparatus 10 temporarily stops the measurement of the non-detection period. If the sensor 19 is not detecting the presence of the user 9, the image forming apparatus 10 resumes the measurement of the non-detection period by terminating the temporary stop of the measurement.

Figure 9:
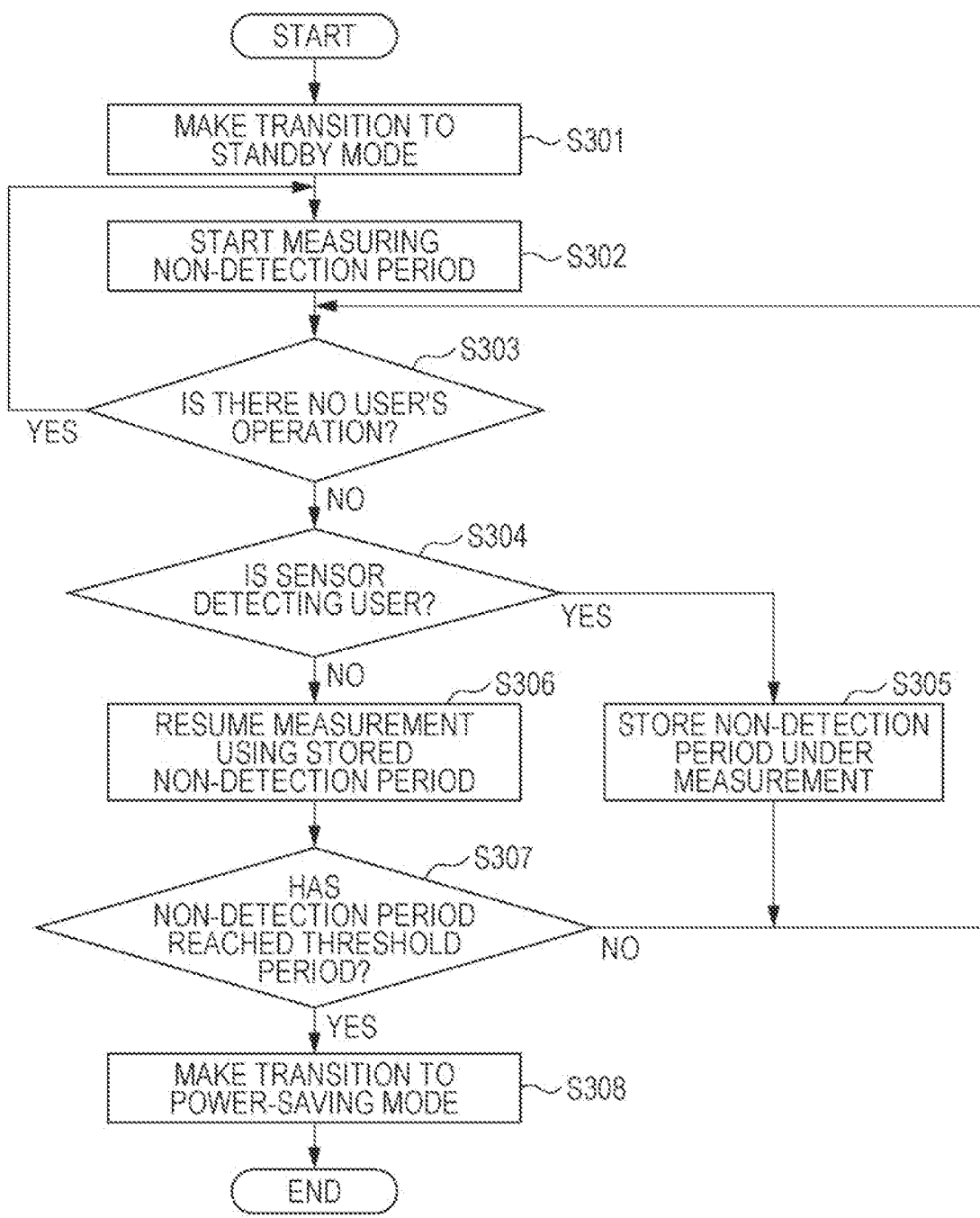
FIG. 9 is a flowchart illustrating a flow of a transition process to be performed by an image forming apparatus according to a third exemplary embodiment.

Operations of the image forming apparatus 10 are described. FIG. 9 is a flowchart illustrating a flow of the transition process to be performed by the image forming apparatus 10. The transition process is performed by the CPU 11 that executes the transition program read from the ROM 12 or the storage 14 and loaded on the RAM 13.

In Step S301, the CPU 11 makes transition to the standby mode. The CPU 11 proceeds to Step S302.

In Step S302, the CPU 11 starts measuring the non-detection period. The CPU 11 proceeds to Step S303.

In Step S303, the CPU 11 determines whether no operation is made by the user 9. If determination is made that no operation is made by the user 9 (Step S303: NO), the CPU 11 proceeds to Step S304. If determination is made that the operation is made by the user 9 (Step S303: YES), the CPU 11 proceeds to Step S302.

In Step S304, the CPU 11 determines whether the sensor 19 is detecting the user 9. If determination is made that the sensor 19 is detecting the user 9 (Step S304: YES), the CPU 11 proceeds to Step S305. If determination is made that the sensor 19 is not detecting the user 9 (Step S304: NO), the CPU 11 proceeds to Step S306.

In Step S305, the CPU 11 stores the non-detection period under measurement. The CPU 11 proceeds to Step S303.

In Step S306, the CPU 11 resumes the measurement using the stored non-detection period. If the non-detection period is not stored, the CPU 11 continues the measurement of the non-detection period started in Step S302. The CPU 11 proceeds to Step S307.

In Step S307, the CPU 11 determines whether the non-detection period has reached the threshold period. If determination is made that the non-detection period has reached the threshold period (Step S307: YES), the CPU 11 proceeds to Step S308. If determination is made that the non-detection period has not reached the threshold period (Step S307: NO), the CPU 11 proceeds to Step S303.

In Step S308, the CPU 11 makes transition to the power-saving mode. The CPU 11 terminates the transition process.

Through Step S305 and Step S306, if the sensor 19 has detected the user 9, the CPU 11 temporarily stops the measurement of the non-detection period. If no operation is made by the user 9 and the sensor 19 is not detecting the user 9, the CPU 11 resumes the measurement of the non-detection period by terminating the temporary stop of the measurement.

Figure 10:
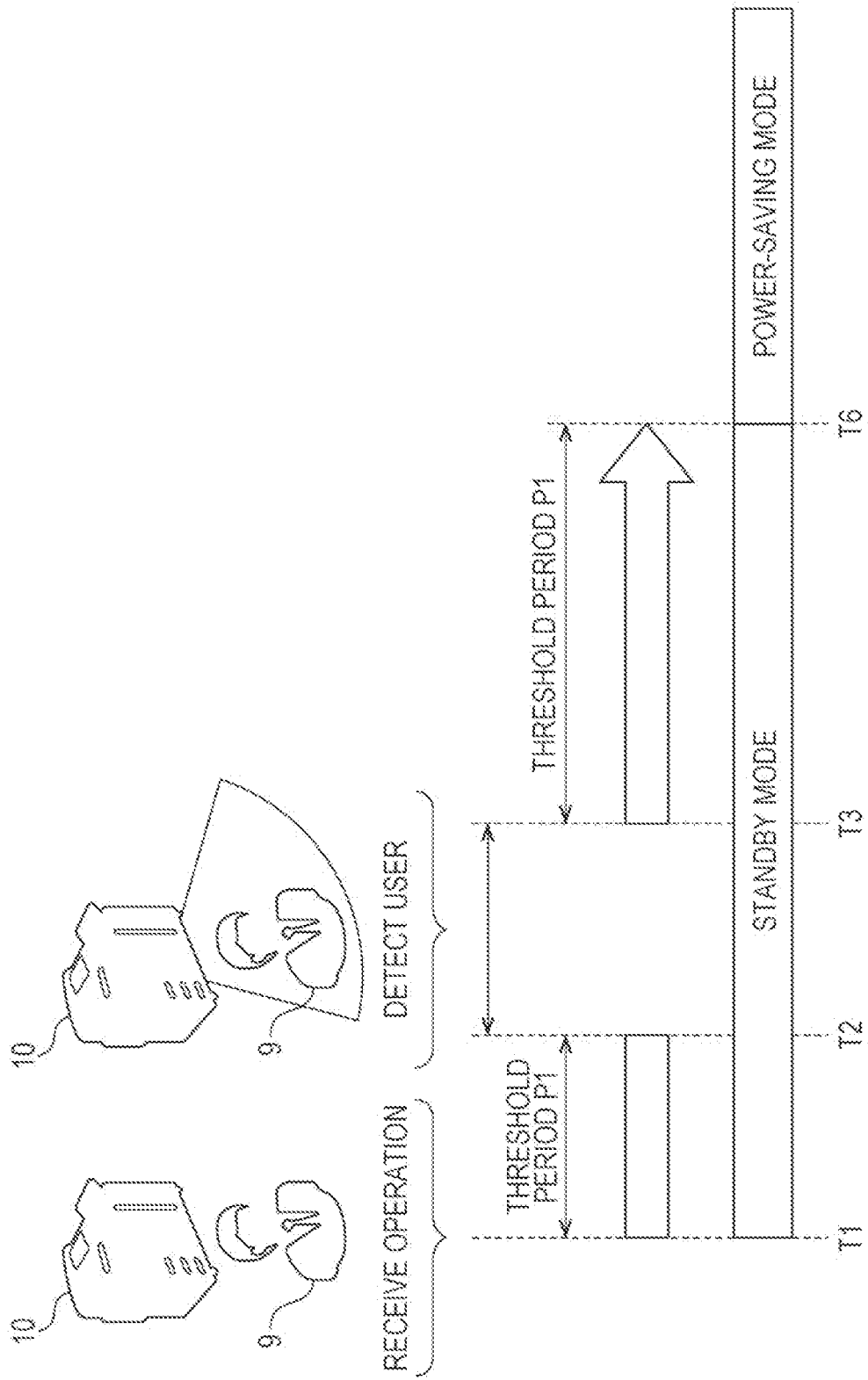
FIG. 10 illustrates an example of the transition process to be performed by the image forming apparatus according to the third exemplary embodiment.

An example of the transition process to be performed by the image forming apparatus 10 is described with reference to FIG. 10. The image forming apparatus 10 makes transition to the power-saving mode when the non-detection period has reached the threshold period P1. In FIG. 10, the horizontal axis represents a time axis, and the time advances rightward in the figure. At the time T1, the image forming apparatus 10 receives the operation made by the user 9, and starts measuring the non-detection period. The image forming apparatus 10 detects the presence of the user 9 from the time T2 to the time T3. After the time T1, no operation is made by the user 9.

The image forming apparatus 10 stores the non-detection period under measurement as a process corresponding to Step S305 because the presence of the user 9 is detected from the time T2 to the time T3. At the time T3 when the presence of the user 9 is not detected, the image forming apparatus 10 resumes the measurement using the stored non-detection period as a process corresponding to Step S306. In other words, the image forming apparatus 10 temporarily stops the measurement of the non-detection period at the time T2 when the presence of the user 9 is detected, and continues to measure the non-detection period by terminating the temporary stop at the time T3 when the presence of the user 9 is not detected. The image forming apparatus 10 makes transition to the power-saving mode at a time T6 when the total of the non-detection period from the time T1 to the time T2 and the non-detection period after the time T3 has reached the threshold period P1.

Modified Examples

Figure 11:
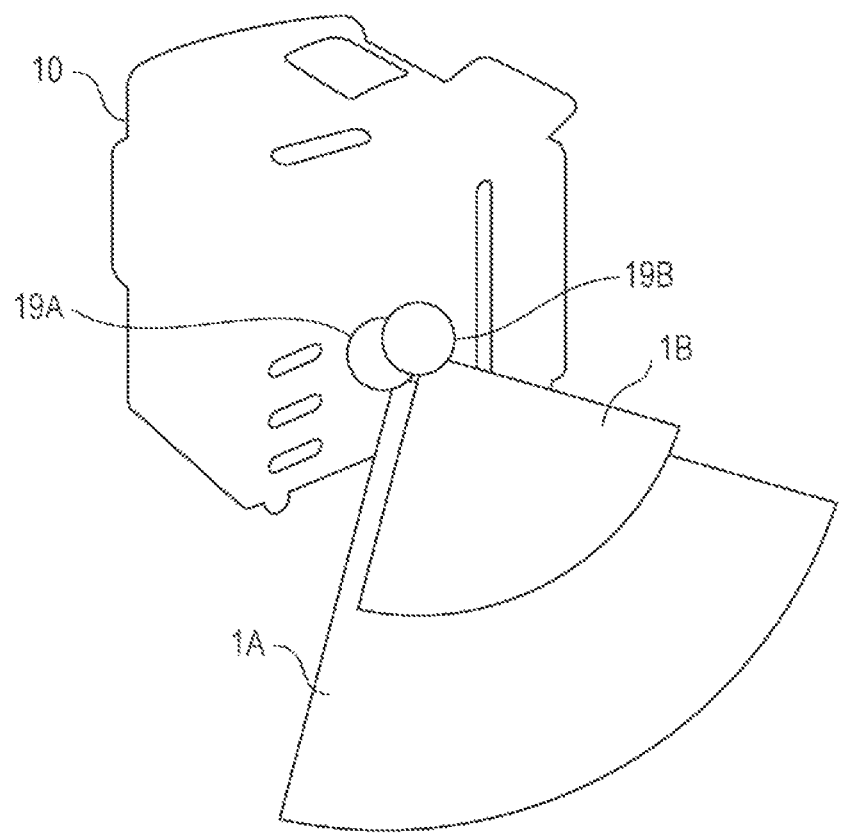
FIG. 11 is a schematic configuration diagram of an image forming apparatus including a plurality of sensors.

The image forming apparatus 10 according to each exemplary embodiment may include, in addition to the sensor 19, another sensor that detects a change in a narrower range than the detection range 1 of the sensor 19. As illustrated in FIG. 11, the image forming apparatus 10 includes a sensor 19A that detects the presence of the user 9 in a detection range 1A, and a sensor 19B that detects the presence of the user 9 in a detection range 1B narrower than the detection range 1A. The image forming apparatus 10 may determine whether the presence of the user 9 is not detected by the other sensor 19B in place of the determination as to whether no operation is made by the user 9 in Step S103, Step S203, Step S208, or Step S303. For example, if the presence of the user 9 is not detected by the sensor 19B in Step S103 (Step S103: NO), the CPU 11 proceeds to Step S104. If the presence of the user 9 is detected by the sensor 19B (Step S103: YES), the CPU 11 proceeds to Step S102. That is, if the presence of the user 9 is detected by the sensor 19B (Step S103: YES), the CPU 11 resets the non-detection period, and starts measuring the reset non-detection period.

The image forming apparatus 10 according to each exemplary embodiment may determine whether no job is assigned in place of the determination as to whether no operation is made by the user 9 in Step S103, Step S203, Step S208, or Step S303. The job is execution of the printing, copying, scanning, or facsimile process.

The image forming apparatus 10 according to each exemplary embodiment may detect the presence of the user 9 based on a connection request for short-range wireless communication from a terminal carried by the user 9. Examples of the short-range wireless communication include Bluetooth (registered trademark) and Wi-Fi (registered trademark). The image forming apparatus 10 may determine whether the connection request for the short-range wireless communication is given from the terminal carried by the user 9 in place of the determination as to whether the sensor 19 is detecting the user 9 in Step S104, Step S204, Step S209, or Step S304. For example, if the connection request for the short-range wireless communication is given from the terminal carried by the user 9 in Step S104 (Step S104: YES), the CPU 11 proceeds to Step S103. If the connection request for the short-range wireless communication is not given from the terminal carried by the user 9 (Step S104: NO), the CPU 11 proceeds to Step S105.

The processes described above may be implemented by a dedicated hardware circuit. In this case, the processes may be performed by a single hardware component or by a plurality of hardware components.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The program for operating the image forming apparatus 10 may be provided in the form of a computer readable recording medium such as a universal serial bus (USB) memory, a flexible disk, or a compact disc read only memory (CD-ROM) or may be provided online via a network such as the Internet. In this case, the program recorded in the computer readable recording medium is generally transferred to and stored in the memory or the storage. For example, the program may be provided as single application software or may be incorporated in software of each apparatus as one function of the image forming apparatus 10.

The exemplary embodiments of the present disclosure are not limited to the image forming apparatus, but are applicable to various types of information processing apparatus such as an automated teller machine installed in a bank or the like, a vending machine, or household appliances including a television set.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
cause the information processing apparatus to make transition from a first mode to a second mode with less energy consumption than the first mode when a non-detection period has reached a preset threshold period; and
determine whether the non-detection period has reached the preset threshold period by:
upon the information processing apparatus being transitioned to the first mode, starting measurement of the non-detection period;
after starting the measurement of the non-detection period, detecting presence of a user around the information processing apparatus;

in response to detecting the presence of the user, determining whether a user operation is input to the information processing apparatus; and upon determining that the user operation is not input, continuing the measurement of the non-detection period without cancelling or resetting the measurement of the non-detection period, wherein the processor is further configured to:

store the non-detection period under measurement in response to detection of the presence of the user around the information processing apparatus during the measurement of the non-detection period; and resume the measurement using the stored non-detection period when no user operation is input and the presence of the user is not detected around the information processing apparatus.

2. The information processing apparatus according to claim 1, wherein the processor is configured to make transition to the second mode when the presence of the user is not detected and the non-detection period has reached the threshold period.

3. The information processing apparatus according to claim 2, wherein the processor is configured to:

cause the information processing apparatus to make transition to any one of three or more modes different in energy consumptions; and set threshold periods for respective transitions.

4. The information processing apparatus according to claim 1, wherein the processor is configured to:

cause the information processing apparatus to make transition to any one of three or more modes different in energy consumptions; and set threshold periods for respective transitions.

5. The information processing apparatus according to claim 4, wherein the processor is configured to:

in response to detection of the presence of the user around the information processing apparatus during measurement of the non-detection period, store one mode in which the non-detection period is being measured;

make transition to a mode with more energy consumption than the one mode while continuing to measure the non-detection period; and make transition back to the stored one mode when no user operation is input and the presence of the user is not detected around the information processing apparatus.

6. The information processing apparatus according to claim 1, wherein the processor is configured to detect the presence of the user around the information processing apparatus by using a sensor configured to detect a change around the information processing apparatus.

7. The information processing apparatus according to claim 6, wherein the processor is further configured to:

during the measurement of the non-detection period, in response to detecting the presence of the user around the information processing apparatus, determine whether an other sensor configured to detect a change around the information processing apparatus in a range narrower than a range of the sensor does not detect the change, and upon determining that the other sensor does not detect the change, continue the measurement of the non-detection period without cancelling or resetting the measurement of the non-detection period.

8. The information processing apparatus according to claim 7, wherein the processor is configured to reset the non-detection period when the other sensor has detected the change during the measurement of the non-detection period.

9. The information processing apparatus according to claim 1, wherein the processor is configured to detect the presence of the user around the information processing apparatus based on a connection request for short-range wireless communication from a terminal carried by the user.

10. The information processing apparatus according to claim 1, wherein the processor is configured to:

during the measurement of the non-detection period, upon determining that the user operation is input, reset the measurement of the non-detection period.

11. A non-transitory computer readable medium storing a program causing a computer to execute a process for processing information, the process comprising:

causing an apparatus including the computer to make transition from a first mode to a second mode with less energy consumption than the first mode when a non-detection period has reached a preset threshold period; and determining whether the non-detection period has reached the preset threshold period by:

upon the information processing apparatus being transitioned to the first mode, starting measurement of the non-detection period;

after starting the measurement of the non-detection period, detecting presence of a user around the information processing apparatus;

in response to detecting the presence of the user, determining whether a user operation is or is not input to the information processing apparatus; and upon determining that the user operation is not input, continuing the measurement of the non-detection period without cancelling or resetting the measurement of the non-detection period, wherein the process further comprises:

storing the non-detection period under measurement in response to detection of the presence of the user around the information processing apparatus during the measurement of the non-detection period; and resuming the measurement using the stored non-detection period when no user operation is input and the presence of the user is not detected around the information processing apparatus.

12. An information processing method comprising:

causing an information processing apparatus to make transition from a first mode to a second mode with less energy consumption than the first mode when a non-detection period has reached a preset threshold period; and determining whether the non-detection period has reached the preset threshold period by:

upon the information processing apparatus being transitioned to the first mode, starting measurement of the non-detection period;

after starting the measurement of the non-detection period, detecting presence of a user around the information processing apparatus;

in response to detecting the presence of the user, determining whether a user operation is or is not input to the information processing apparatus; and upon determining that the user operation is not input, continuing the measurement of the non-detection period without cancelling or resetting the measurement of the non-detection period, wherein the method further comprises:

storing the non-detection period under measurement in response to detection of the presence of the user around the information processing apparatus during the measurement of the non-detection period; and resuming the measurement using the stored non-detection period when no user operation is input and the presence of the user is not detected around the information processing apparatus.

* * * * *